(12) United States Patent
Oguchi

(10) Patent No.: US 6,547,601 B2
(45) Date of Patent: Apr. 15, 2003

(54) CARD CONNECTOR DEVICE (75) Inventor: Wataru Oguchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 16 days.

(21) Appl. No.: 09/847,611

(22) Filed: May 2, 2001

(65) Prior Publication Data

US 2001/0053622 A1 Dec. 20, 2001

(30) Foreign Application Priority Data

| May 30, 2000 | (JP) | 2000-164786 |
| May 30, 2000 | (JP) | 2000-164787 |
| May 30, 2000 | (JP) | 2000-164788 |

(51) Int. Cl.$^7$ .............................. H01R 24/00
(52) U.S. Cl. ............................................ 439/630
(58) Field of Search ................. 439/630, 862, 439/83, 876, 637, 60, 79, 188, 159, 152

(56) References Cited

U.S. PATENT DOCUMENTS

| 5,013,255 A | * | 5/1991 | Juret et al. .................. 439/630 |
| 5,186,633 A | * | 2/1993 | Mosser, III .................. 439/79 |
| 5,238,412 A | * | 8/1993 | Morishita et al. ............. 439/83 |
| 5,842,886 A | * | 12/1998 | Illg et al. ..................... 439/83 |
| 6,099,335 A | * | 8/2000 | Chang ......................... 439/188 |
| 6,099,353 A | * | 8/2000 | Wu ............................. 439/630 |
| 6,247,947 B1 | * | 6/2001 | Knoernschild et al. ...... 439/159 |
| 6,312,265 B1 | * | 11/2001 | Mohtar et al. ............... 439/79 |
| 6,332,791 B1 | * | 12/2001 | Wang et al. ................. 439/159 |

FOREIGN PATENT DOCUMENTS

JP          11-307191        11/1999

* cited by examiner

Primary Examiner—Gary Paumen
Assistant Examiner—Felix O. Figueroa
(74) Attorney, Agent, or Firm—Beyer Weaver & Thomas, LLP (57) ABSTRACT

The card connector device includes a header, the header having a plurality of contact pieces to be contacted with contacts of an IC card, a frame provided with a card receptacle portion contiguous to the header, and an electrically conductive cover member attached to the frame so as to cover the receptacle portion, the frame being formed with a switch portion which is operated with insertion and ejection of the card. The switch portion includes a contact plate which is pushed outwards with insertion of the card and a part of the cover member which is brought into abutment against the contact plate, the contact plate being brought into and out of contact with the cover member with insertion and ejection of the card.

12 Claims, 10 Drawing Sheets

CARD CONNECTOR DEVICE

BACKGROUND OF THE INVENTION

1. Field of the Invention

The present invention relates to structure of a card connector device to be used for, for example, IC (integrated circuit) cards as storage mediums in personal computers or the like and CF (compact flash) cards which are used in electronic devices such as digital cameras.

2. Description of the Prior Art

IC card connector devices are generally used as devices for extension storage of personal computers for example, and IC cards are becoming more and more popular as storage mediums in IC card connector devices.

An IC card is loaded into an IC card connector device to write and read necessary information. Generally, an IC card is provided with an identifier which indicates write inhibit, while the IC card connector device side is provided with a detector switch for detecting the insertion of the IC card and a detector switch (a write protect switch) for identifying IC card write inhibit. In the conventional IC card connector device, when the IC card provided with such an identifier is to be loaded therein, a detector switch having elongated lead terminals disposed opposedly to each other with contacts formed at tips of the lead terminals is disposed at a position corresponding to the identifier of the IC card which indicates write inhibit, and the contacts of the detector switch are opened and closed correspondingly to the identifier of the IC card as the IC card is inserted, thereby detecting whether write into the IC card is possible or not.

The IC card connector device is provided with a header having plural contact pieces arranged side by side correspondingly to the plural contacts which are arranged side by side on the IC card side. The header is further provided with plural connecting pieces integral with the contact pieces, the connecting pieces being soldered to circuit patterns formed on a circuit board to which the IC card connector device is attached. The contact pieces and the connecting pieces are electrically connected together within the header. According to a certain configuration of the plural contacts formed in the IC card, as defined by a related standard, some contacts are spaced narrower than the other contacts. Therefore, also in the header of the IC card connector device, some contact pieces are spaced narrower than the other contact pieces correspondingly to the spacings of the contacts in the IC card.

A certain IC card connector device is provided with a lock mechanism which causes an IC card to be locked to a card receiving position when inserted into the connector device and which unlocks the IC card when the card is to be ejected, allowing the IC card to be ejected from the card receiving position. The lock mechanism is provided with a heart-shaped locking cam formed on a frame which has an IC card receptacle portion and a locking pin engaged at one end thereof with the locking cam and supported at the opposite end by a slide member rotatably. As an IC card is inserted, the slide member is moved in the direction of the IC card insertion, whereby the one end portion of the locking pin comes into sliding contact with the locking cam to effect locking and unlocking. In the lock mechanism, if the IC card locked in the card receiving position is once pushed in the card inserting direction, the locking pin becomes disengaged from the lock portion of the locking cam and the IC card is ejected in the direction of its ejection with a biasing force of a coiled spring which urges the slide member in the card ejecting direction.

However, in the above structure of the detector switch used in the conventional IC card connector device, two lead terminals are used and they must be spaced a predetermined distance from each other in a mutually opposed relation, with consequent increase in the width of the entire IC card connector device, thus giving rise to the problem that it is impossible to attain the reduction of thickness and size.

Moreover, in the structure of the header used in the above conventional IC card connector device, the contact pieces are disposed correspondingly to the spacings of the contacts of the IC card so that some contact pieces are narrower in spacing than the other contact pieces. Accordingly, some contact pieces also become narrow in spacing, thus causing the problem that the soldering work efficiency for the circuit board is extremely low.

Further, in the structure of the IC card connector device provided with the conventional lock mechanism described above, for ejecting the IC card received in the card receiving position, it is necessary that the IC card be once pushed in its inserting direction, that is, it is necessary that a space for permitting an overstroke of the IC card be formed between a front end of the IC card lying in the card receiving position and a rear end of the IC card receptacle portion, with the result that the depth of the IC card connector device increases, making it impossible to attain the reduction of size. Additionally, in the case where the IC card connector device is used in a portable electronic device, there has heretofore been the problem that the locking pin is disengaged from the lock portion of the locking cam due to external oscillations or the locking pin slides in the reverse direction on the locking cam.

SUMMARY OF THE INVENTION

Accordingly, it is an object of the present invention to solve the above-mentioned problems and provide a structure of a card connector device provided with a detector switch for identifying IC card write inhibit and capable of constructing the detector switch in a simple manner and attaining the reduction of thickness and size of the entire card connector device.

It is another object of the present invention to provide a card connector device having a header wherein connecting pieces are formed in a deviated state to a central side with respect to arranged positions of contact pieces and are spaced at equal intervals as a whole, thereby improving the working efficiency in soldering the connecting pieces to a circuit board.

It is a further object of the present invention to provide a structure of a card connector device having a lock mechanism and capable of attaining the reduction of size and making the lock mechanism stable without an increase in depth of the card connector device even for an overstroke of an IC card inserted therein.

For solving the above-mentioned problems, in the first aspect of the present invention there is provided a card connector device comprising a header having a plurality of contact pieces to be connected with contacts of a card, a frame contiguous to the header and having a card receptacle portion, and an electrically conductive cover member attached to the frame so as to cover the card receptacle portion, wherein the frame is formed with a switch portion which is operated with insertion and ejection of the card, the switch portion comprising a contact plate which is pushed outward with insertion of the card and a part of the cover member which is brought into abutment against the contact plate, the contact plate being brought into and out of contact with the cover member with insertion and ejection of the card.

In the second aspect of the present invention there is provided, in combination with the first aspect, a card connector device wherein the card is provided with an identifier which indicates write inhibit, and the contact plate is brought into and out of contact with the cover member correspondingly to the identifier, thereby detecting whether write into the card is possible or not.

In the third aspect of the present invention there is provided, in combination with the first aspect, a card connector device wherein the contact plate is disposed at an outer side portion of the frame and has a projecting portion projecting to the receptacle portion side and also has a contact portion, the contact portion being formed on the side opposite to the projecting portion and adapted to come into abutment against the cover member, and the cover member is disposed so as to cover the contact plate together with the receptacle portion.

In the fourth aspect of the present invention there is provided, in combination with the third aspect, a card connector device wherein the contact portion is formed on a free end side with respect to the position where the projecting portion is formed.

In the fifth aspect of the present invention there is provided, in combination with the third aspect, a card connector device wherein the projecting portion is formed in a dome-like expanded shape.

In the sixth aspect of the present invention there is provided a card connector device comprising a header having connector terminals, the connector terminals comprising a plurality of contact pieces arranged correspondingly to arranged positions of contacts formed on a card side and a plurality of connecting pieces drawn out from the contact pieces and soldered to a circuit board, and a frame contiguous to the header and having a card receptacle portion, wherein some of the plural contact pieces are spaced narrower than the other contact pieces, and the plural connecting pieces are spaced at equal intervals in their juxtaposed direction so as to be wide for the narrow spacing of the some of the contact pieces and narrow for the spacing of the other contact pieces.

In the seventh aspect of the present invention there is provided, in combination with the sixth aspect, a card connector device wherein the connector terminals have base portions which support the contact pieces in a cantilevered state, the connecting pieces are formed to be projected on one end sides of the base portions, and the connecting pieces are positioned so as deviate little by little in the juxtaposed direction of the connector terminals with respect to the arranged positions of the contact pieces.

In the eighth aspect of the present invention there is provided, in combination with the seventh aspect, a card connector device wherein the connecting pieces are contiguous to one end sides of the base portions which are positioned on a central side of the frame, and are arranged so as to deviate in the central direction of the frame with respect to the centers of the base portions, and free ends of the connecting pieces are soldered to the circuit board through a through aperture formed in the frame.

In the ninth aspect of the present invention there is provided, in combination with the seventh aspect, a card connector device wherein the connector terminals are formed by molding integrally with the header in a state in which the contact pieces and the connecting pieces are projected from the header.

In the tenth aspect of the present invention there is provided, in combination with the ninth aspect, a card connector device wherein between the some contact pieces which are spaced narrowly, the base portions of the associated connector terminals are formed with coupler portions, and after the integral molding of the connector terminals with the header, the coupler portions are cut off to separate the contact pieces from each other.

In the eleventh aspect of the present invention there is provided a card connector device comprising a slide member adapted to be engaged with a card and slidable in card inserting/ejecting directions, a biasing member for urging the slide member in the card ejecting direction, a frame having a card receptacle portion and a heart-shaped locking cam, and a locking pin adapted to engage the locking cam to lock the slide member to a card receiving position, wherein an opening is formed on a rear end side of the card receptacle portion of the frame, and when the card is to be ejected, the card lying in the card receiving position is pushed in its inserting direction, allowing a front end of the card to be projected from the opening, whereby the locking pin is disengaged from the locking cam and the card is ejected in the ejecting direction by the slide member.

In the twelfth aspect of the present invention there is provided, in combination with the eleventh aspect, a card connector device wherein the frame is formed with a delimiting portion for delimiting the movement of the slide member in a direction in which the slide member is pushed after unlocked when the card lying in the card receiving position is pushed in its inserting direction.

In the thirteenth aspect of the present invention there is provided, in combination with eleventh aspect, a card connector device wherein the front end of the card is formed with a slant surface-like cutout portion, and the slide member is brought into engagement with the cutout portion and is moved slidingly.

In the fourteenth aspect of the present invention there is provided, in combination with the eleventh aspect, a card connector device wherein one end side of the locking pin is pivotably secured to the slide member and is pushed by the biasing member to an inner wall surface of an axial bore into which it is inserted, while an opposite end side of the locking pin is engaged with the locking cam slidably.

In the fifteenth aspect of the present invention there is provided, in combination with the fourteenth aspect, a card connector device wherein the biasing member is a coiled spring, the slide member is formed with a spring accommodating recess for receiving the coiled spring therein, and the axial bore is formed on one end side of the spring accommodating recess.

DETAILED DESCRIPTION OF A PREFERRED EMBODIMENT

Figure 1:
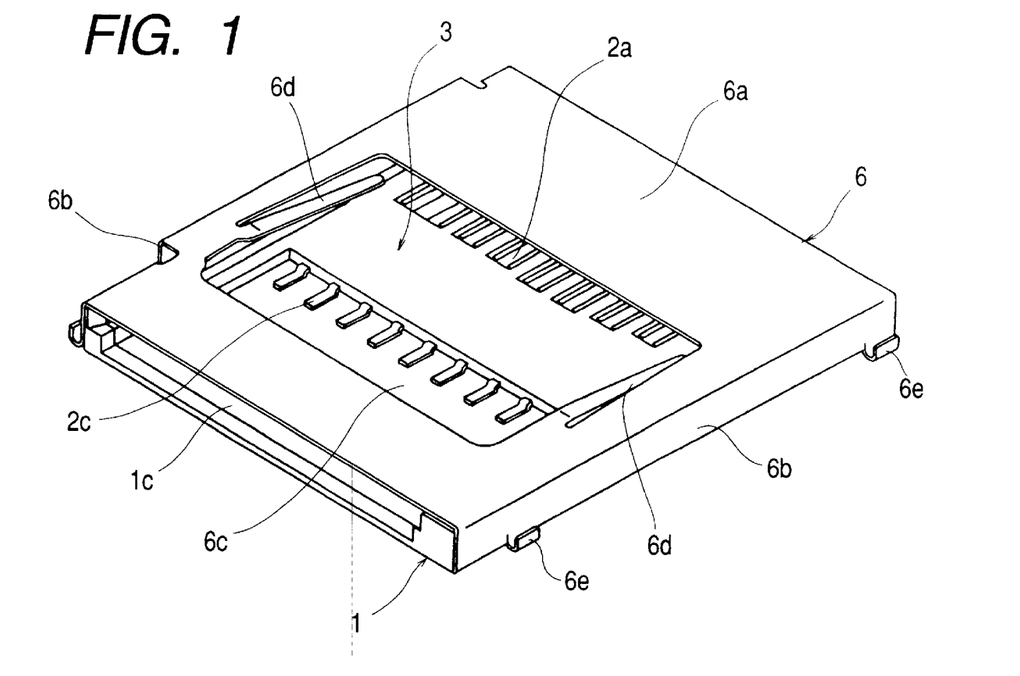
FIG. 1 is a perspective view showing the whole of a card connector device according to an embodiment of the present invention.
Figure 2:
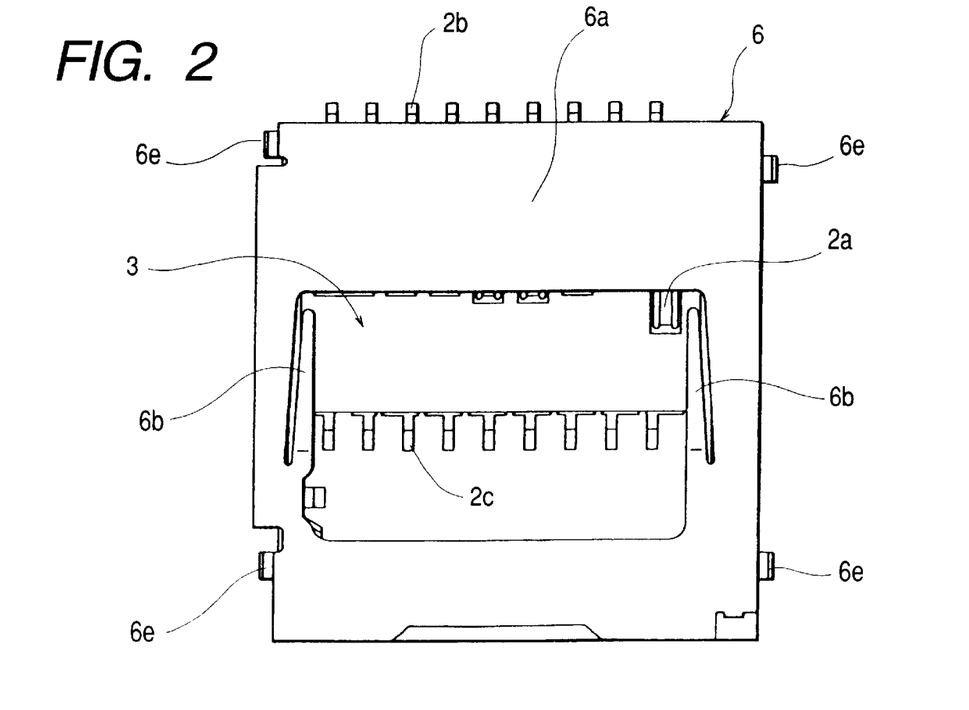
FIG. 2 is a plan view thereof.
Figure 3:
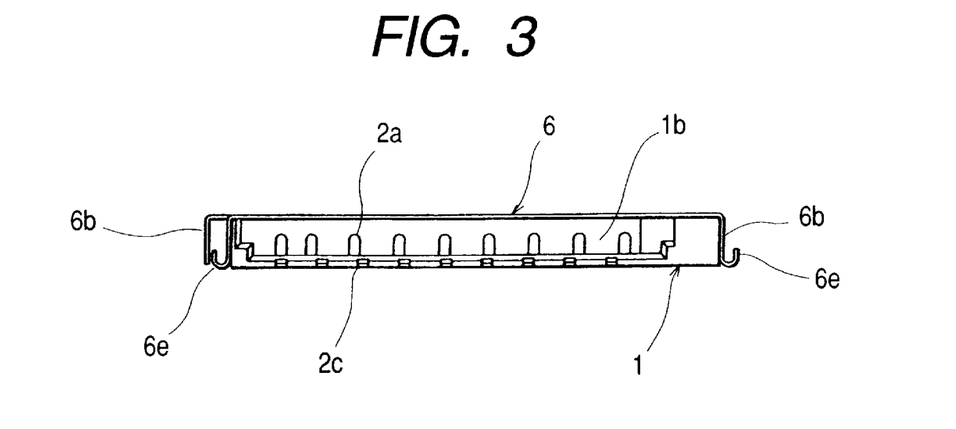
FIG. 3 is a front view thereof.
Figure 4:
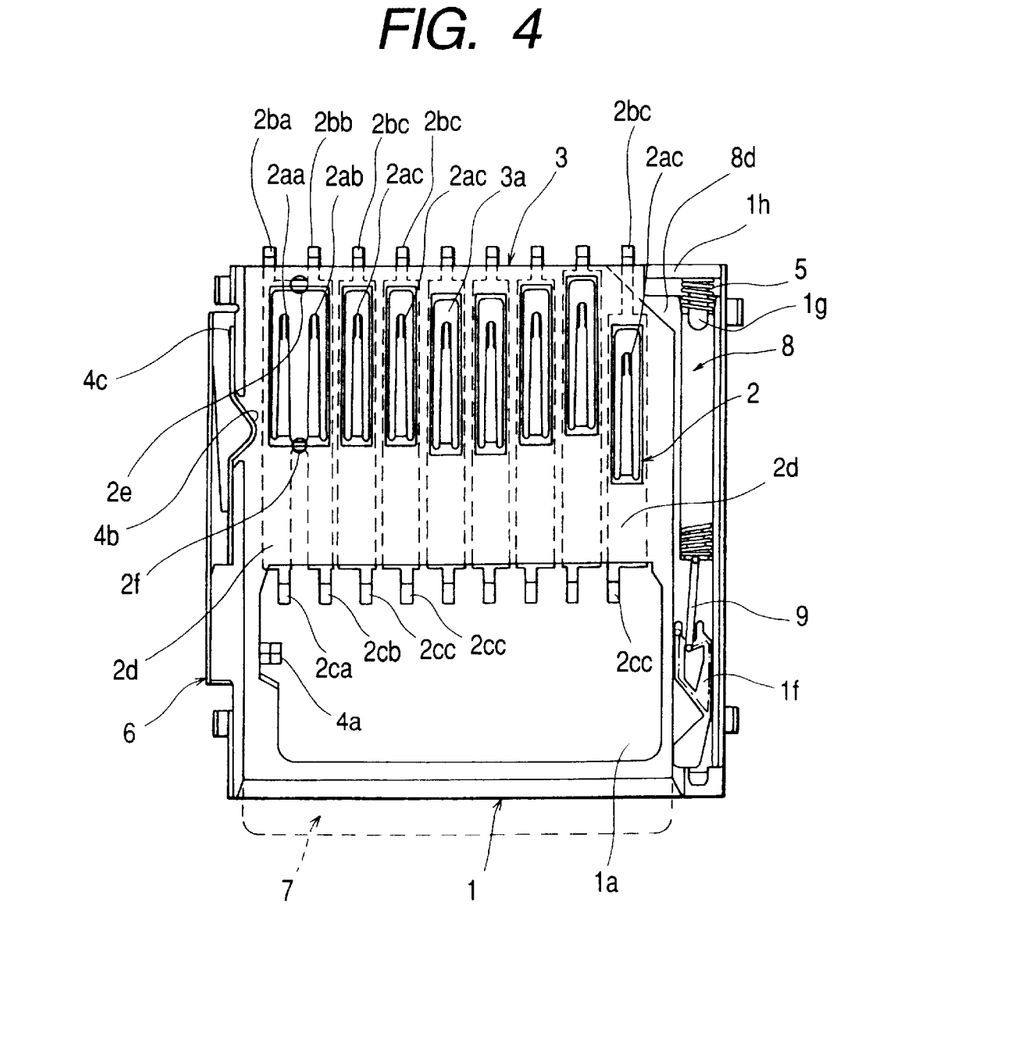
FIG. 4 is a plan view showing a header portion and a frame portion in the card connector device.
Figure 5:
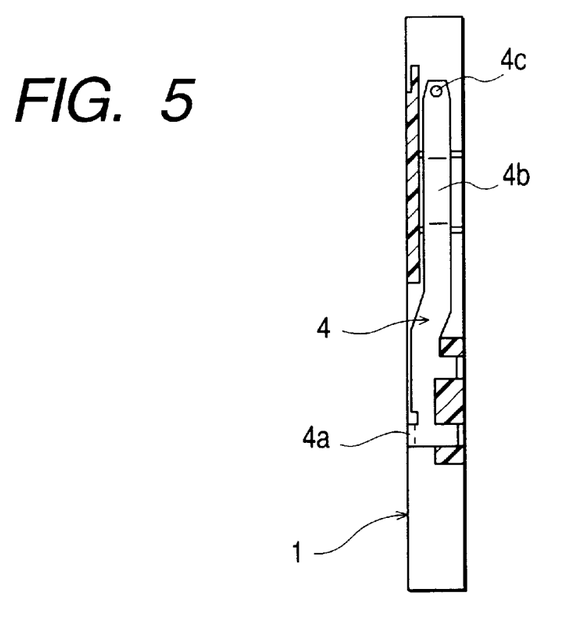
FIG. 5 is an explanatory diagram showing a detector switch portion in the card connector device.
Figure 6:
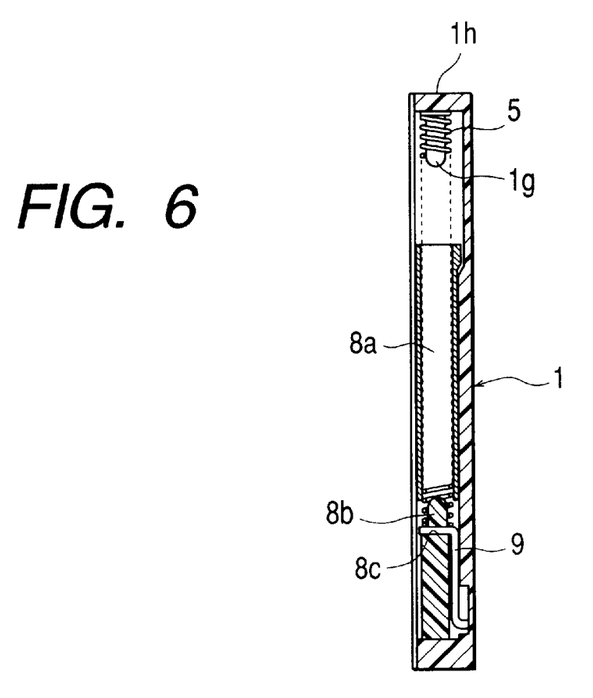
FIG. 6 is an explanatory diagram showing an engaged portion of a slide member and a frame in the card connector device.
Figure 7:
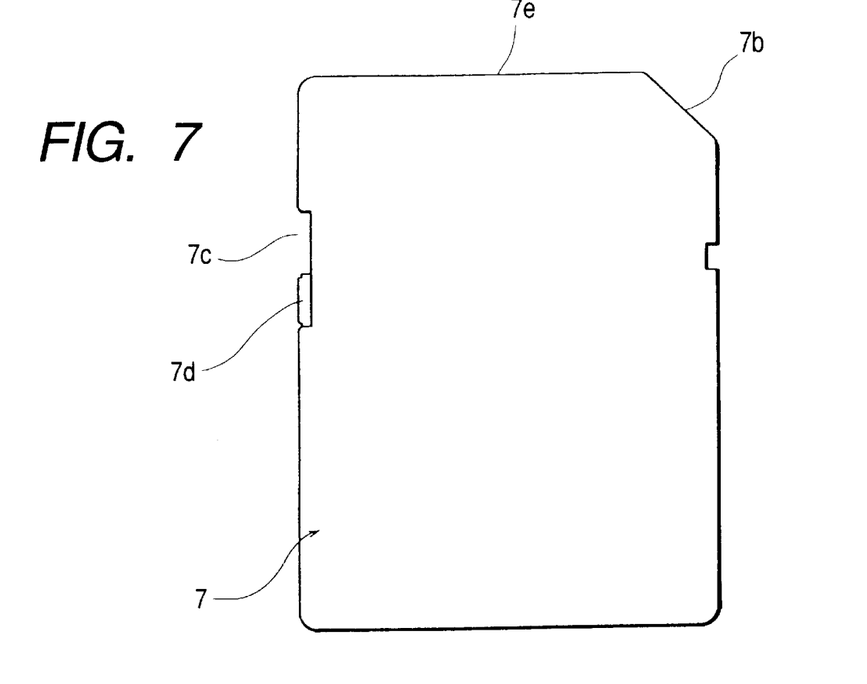
FIG. 7 is a plan view showing an IC card which is applied to the card connector device.
Figure 8:
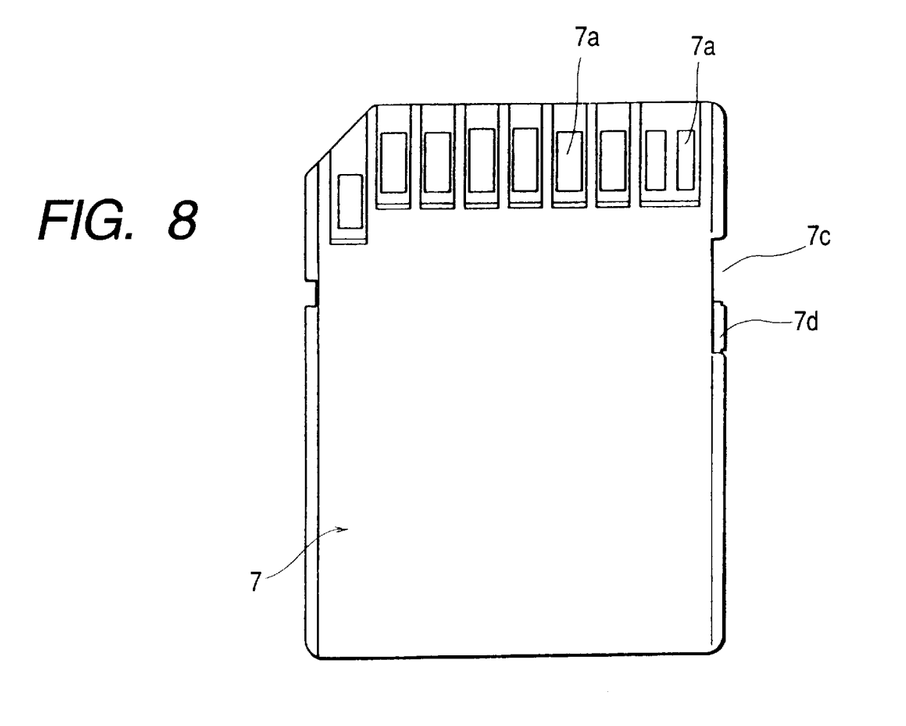
FIG. 8 is a bottom view thereof.
Figure 9:
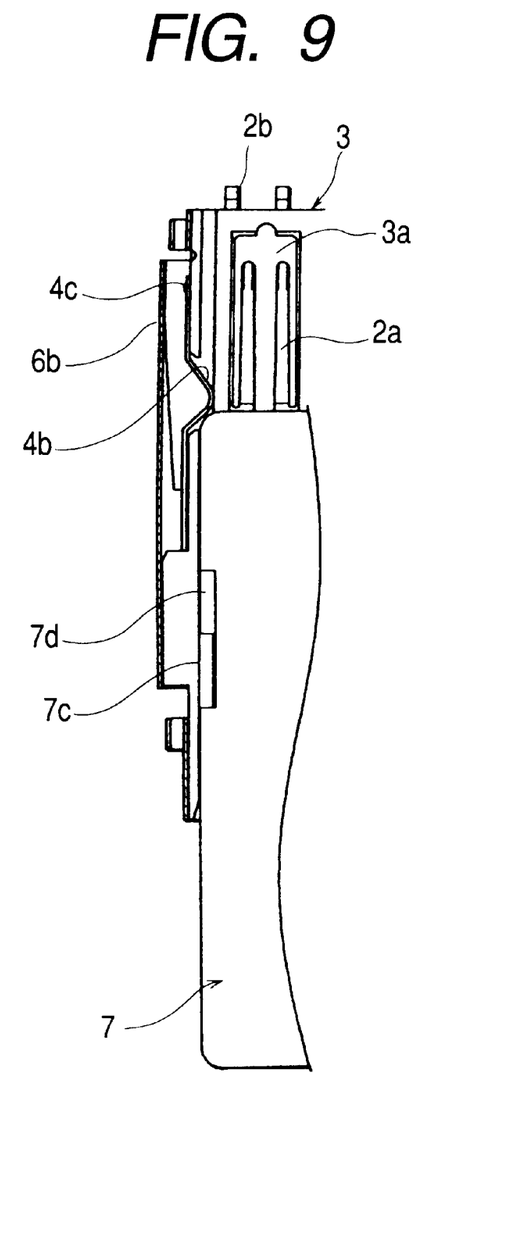
FIG. 9 is an explanatory diagram showing the detector switch portion before insertion of the IC card.
Figure 10:
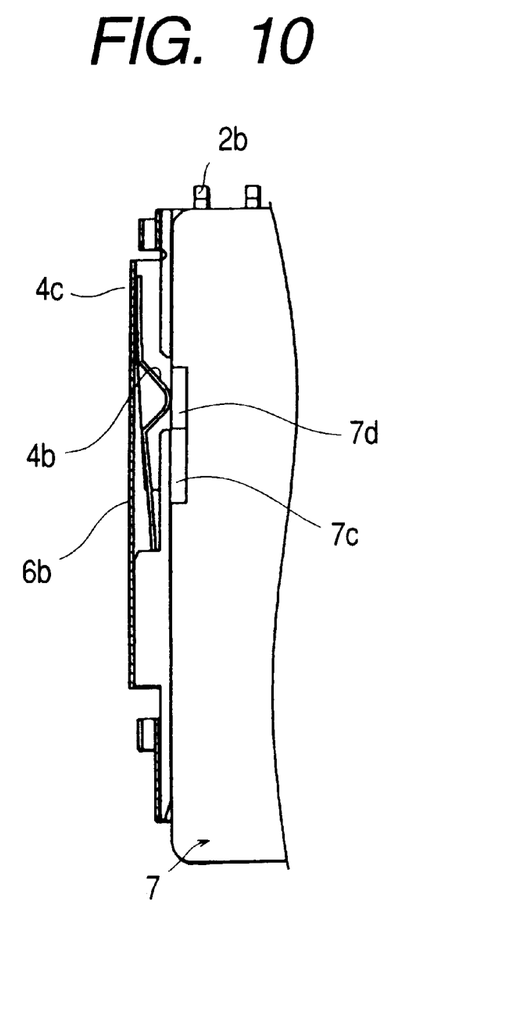
FIG. 10 is an explanatory diagram showing the detector switch portion after insertion of the IC card.
Figure 11:
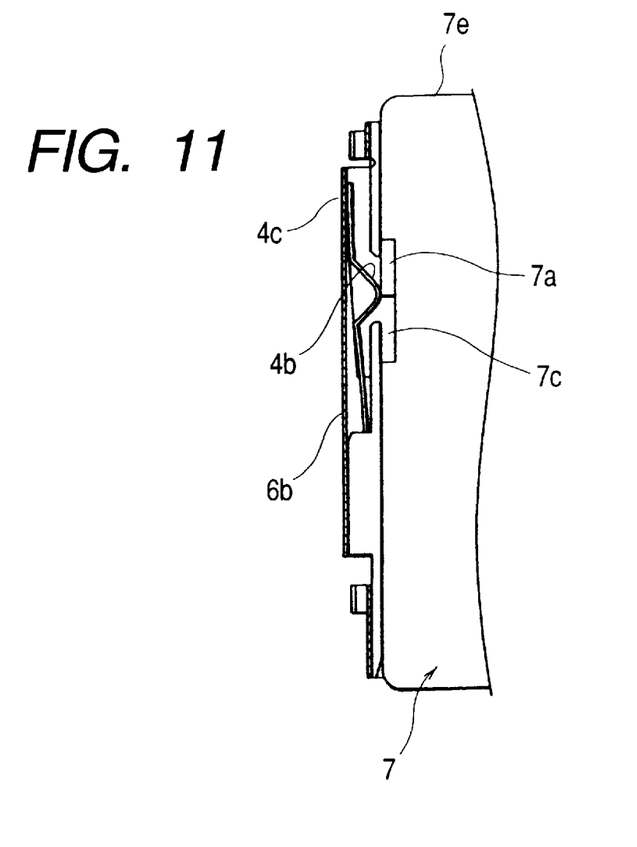
FIG. 11 is an explanatory diagram showing the detector switch portion during insertion of the IC card.
Figure 12:
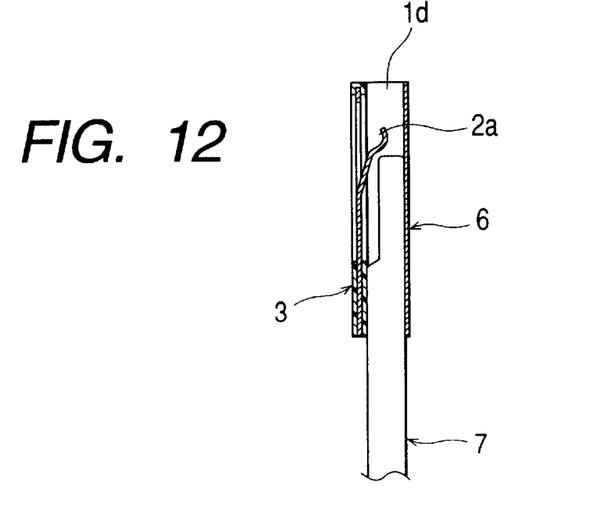
FIG. 12 is an explanatory diagram showing a contact piece portion before insertion of the IC card.
Figure 13:
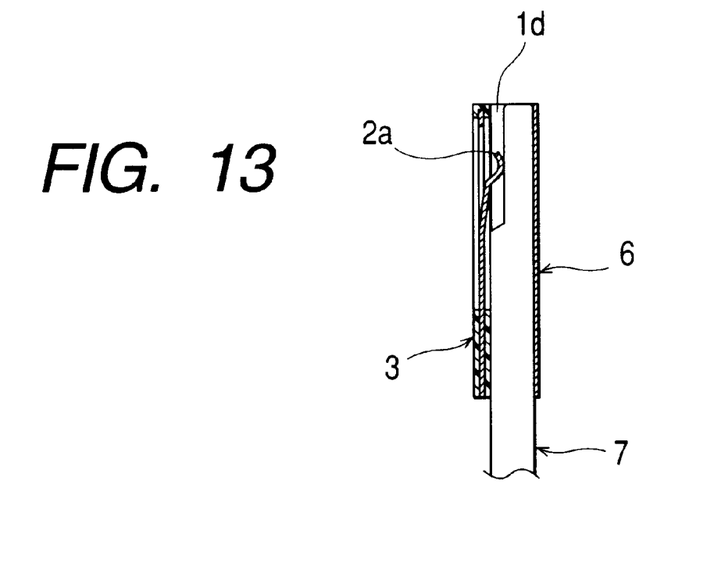
FIG. 13 is an explanatory diagram showing the contact piece portion after insertion of the IC card.
Figure 14:
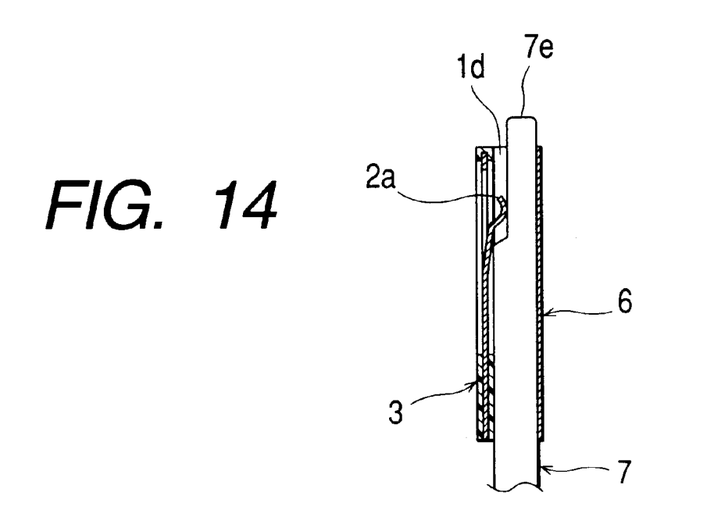
FIG. 14 is an explanatory diagram showing the contact piece portion during insertion of the IC card.
Figure 15A:
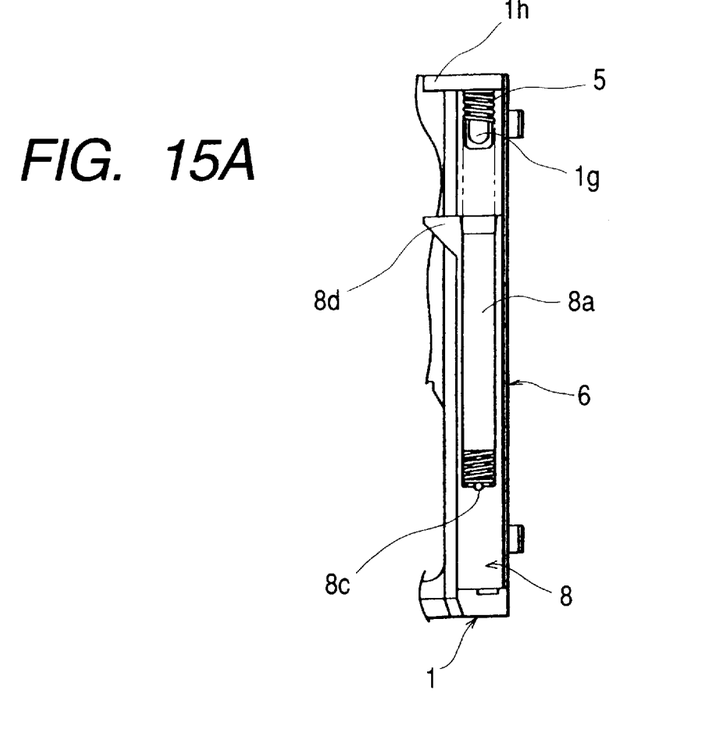
FIGS. 15A and 15B are explanatory diagrams showing the slide member and a lock mechanism portion before insertion of the IC card.
Figure 15B:
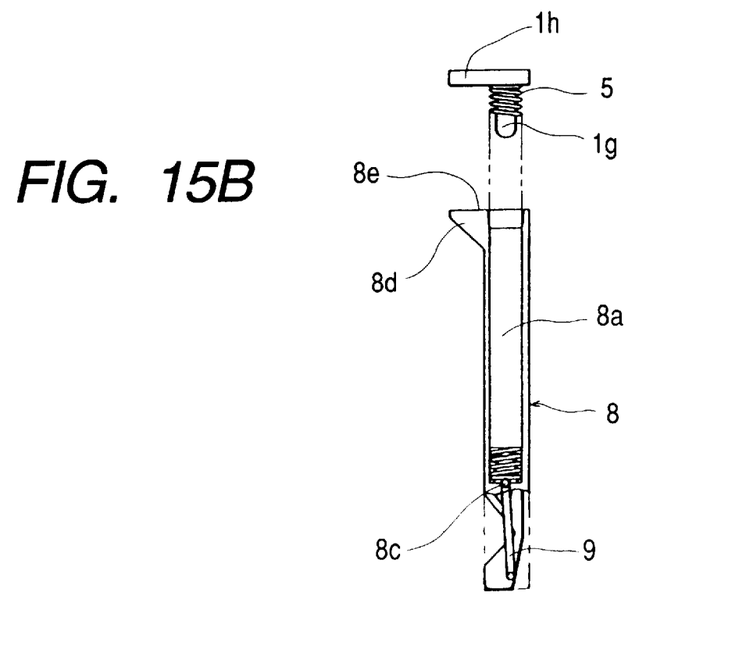
Figure 16A:
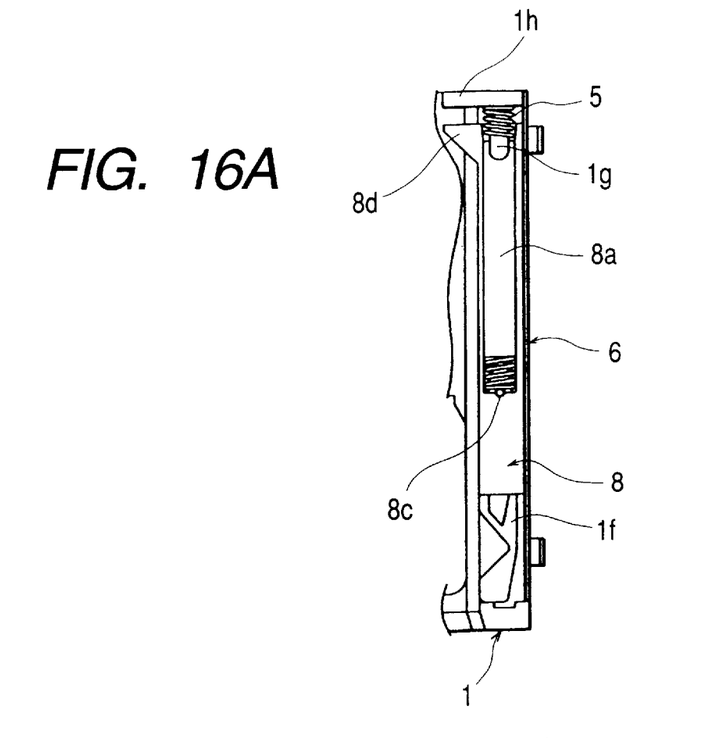
FIGS. 16A and 16B are explanatory diagrams showing the slide member and the lock mechanism portion after insertion of the IC card.
Figure 16B:
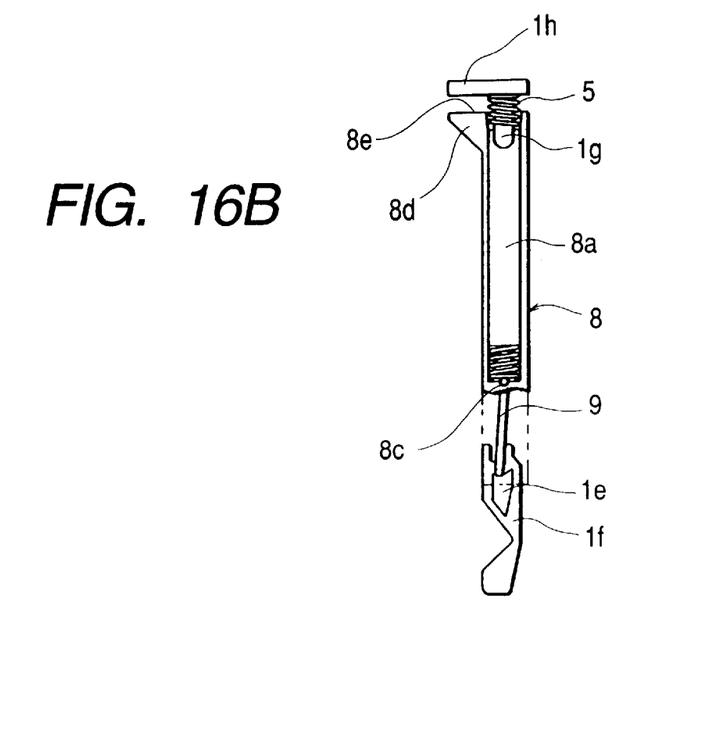
Figure 17A:
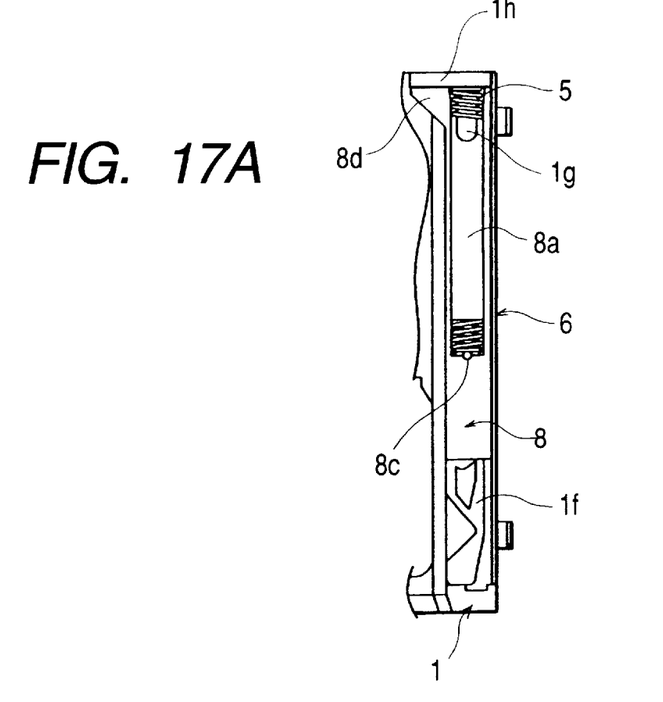
FIGS. 17A and 17B are explanatory diagrams showing the slide member and the lock mechanism portion during insertion of the IC card.
Figure 17B:
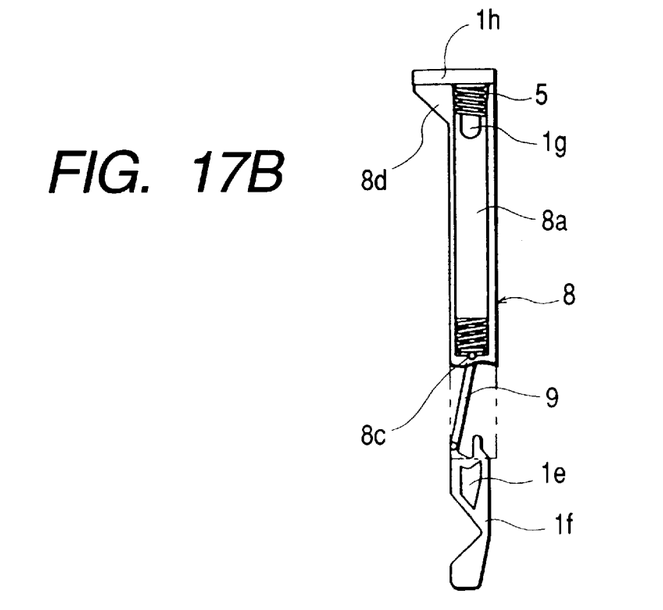

An embodiment of the present invention will be described hereinunder with reference to FIGS. 1 to 17, of which FIG. 1 is a perspective view showing the whole of a card connector device embodying the invention, FIG. 2 is a plan view thereof, FIG. 3 is a front view thereof, FIG. 4 is a plan view of a header portion and a frame portion, FIG. 5 is an explanatory diagram of a detector switch portion, FIG. 6 is an explanatory diagram of an engaged portion of a slide member and a frame, FIG. 7 is a plan view of an IC card, FIG. 8 is a bottom view thereof, FIG. 9 is an explanatory diagram of the detector switch portion before insertion of the IC card, FIG. 10 is an explanatory diagram of the detector switch portion after insertion of the IC card, FIG. 11 is an explanatory diagram of the detector switch portion during insertion of the IC card, FIG. 12 is an explanatory diagram of a contact piece portion before insertion of the IC card, FIG. 13 is an explanatory diagram of the contact piece portion after insertion of the IC card, FIG. 14 is an explanatory diagram of the contact piece portion during insertion of the IC card, FIGS. 15A and 15B are explanatory diagrams of the slide member and a lock mechanism portion before insertion of the IC card, FIGS. 16A and 16B are explanatory diagrams of the slide member and the lock mechanism portion after insertion of the IC card, and FIGS. 17A and 17B are explanatory diagrams of the slide member and the lock mechanism portion during insertion of the IC card.

In the drawings, a frame 1 is formed of an insulating material such as a synthetic resin in the shape of a flat plate having an upper opening. An inside bottom of the frame 1 is provided with a header 3, the header 3 being formed of an electrically conductive metallic material and having plural connector terminals 2 arranged side by side. Centrally of the header 3 are formed a plurality of relief holes 3a, in which a plurality of contact pieces 2a are formed projectingly, the contact pieces 2a being connected to contacts 7a of an IC card 7 which will be described later. On both end sides of the header 3 with the relief holes 3a therebetweeen there are formed a plurality of connecting pieces 2b and 2c to be projected, the connecting pieces 2b and 2c being soldered to, for example, circuit patterns formed on a circuit board in an electronic device (not shown) or the like. One connecting pieces 2b are projected outwards from one end side of the frame 1, while the other connecting pieces 2c are projected into a through aperture 1a formed centrally of the frame 1 and are soldered to the circuit board through the through aperture 1a.

Plate-like base portions 2d of the connector terminals 2 are integrally formed and fixed to the header 3 by insert molding for example. Within the header 3, the contact pieces 2a and the connecting pieces 2b, 2c are electrically connected with each other through the base portions 2d of the connector terminals 2.

The plural contact pieces 2a are spaced side by side from one another so as to match the spacing of contacts 7a provided on the IC card 7 side. In this embodiment, as shown in FIG. 4, two contact pieces 2aa and 2ab located on the left end side are spaced a little narrower than a space between other contact pieces indicated at 2ac. Out of the connecting pieces 2b and 2c, as to one connecting pieces 2b, only the two connecting pieces located on the left end side and indicated at 2ba and 2bb respectively are spaced wide to match the spacing of the other connecting pieces indicated at 2bc so that the connecting pieces 2b are all spaced at equal intervals in their juxtaposed direction. As to the other connecting pieces 2c, since they are juxtaposed within the through aperture 1a of the frame 1, the two connecting pieces located on the left end side and indicated at 2ca and 2cb respectively are spaced wide relative to the narrow spacing between the contact pieces 2aa and 2ab and narrowly relative to the spacing of the other contact pieces 2ac, whereby the connecting pieces 2c are all spaced at equal intervals in their juxtaposed direction. The contact pieces 2ac are arranged centrally of the base portions 2d of the connector terminals 2, while the connecting pieces 2c are deviated toward the center of the frame 1 with respect to the centers of the base portions 2d.

Thus, the connecting pieces 2c are deviated as a whole to the center of the frame 1, that is, the size of the through aperture 1a through which the connecting pieces 2c are passed for soldering can be made small, so that side edge portions of the frame 1 can be made large in size and hence it is possible to enhance the strength of the frame. Besides, since the connecting pieces 2c are formed at equal intervals in their juxtaposed direction, that is, since there is no narrower space portion, the problem of deteriorated soldering work efficiency is eliminated.

As shown in FIG. 4, in the connector terminals 2 formed integrally with the header 3 by insert molding for example, the two contact pieces 2aa and 2ab located on the left end side are connected together by coupler portions 2e and 2f formed in the base portions 2d of the connector terminals 2. After the header 3 is formed by integral molding, the coupler portions 2e and 2f (the circled portions in FIG. 4) are cut and separated with a cutting punch or the like.

Thus, even in the case of narrowly spaced contact pieces 2a like the two contact pieces 2aa and 2ab located on the left end side, it is possible to separate them sealedly from mold cavities if the coupler portions 2e and 2f are held by the mold grippingly and simultaneously, thus making it possible to mold the contact pieces 2aa and 2ab integrally with the header 3 in a projected state from the header.

A recess as a receptacle portion 1b for receiving therein the IC card 7 which will be described later is formed at a center of the frame 1, and the through aperture 1a is formed at a center of the receptacle portion 1b. On a front end side of the frame 1 is formed an inlet port 1c for the IC card 7, while on a rear end side of the frame is formed on opening 1d for allowing a front end portion 7e of the IC card 7 to project therethrough. On a left outer side of the frame 1 is disposed a contact plate 4 formed of an electrically conductive metallic material, while on a right-hand side of the frame are provided a heart-shaped locking cam 1f, the locking cam 1f having a locking portion 1e for locking a slide member 8 to be described later to the received position of the IC card 7, and a spring retaining portion 1g for retaining a coiled spring 5 which serves as a biasing member for urging the slide member 8 in a card ejecting direction.

A wall-like delimiting portion 1h for delimiting the movement of the slide member 8 in a card inserting direction after unlocking of the slide member is formed on one end side of the opening 1d of the frame 1.

The contact plate 4 is constituted by a flat metallic plate and is secured on one end side thereof to the frame 1 pivotably. One end portion of the contact plate 4 is projected into the through aperture 1a to form a terminal portion 4a. The contact plate 4 is centrally formed with a generally V-shaped projecting portion 4b which projects to the receptacle portion 1b side. On a free end side opposite to the projecting side of the projecting portion 4b the contact plate 4 is formed with a contact portion 4c for abutment against a cover member 6 which will be described later. The projecting portion 4b comes into abutment against a lug 7d of the IC card 7 to be described later which is inserted into the receptacle portion 1b, the lug 7d being a write inhibit identifier of the IC card, whereby the contact plate 4 is pivotally moved outward and the contact portion 4c is put in abutment against the cover member 6 to be described later, thereby turning ON a switch portion and allowing a signal to be outputted.

The cover member 6, which is formed in a generally inverted U shape using an electrically conductive metallic material, comprises an upper plate portion 6a as a flat plate portion and opposed side plate portions 6b. A window aperture 6c is formed in the upper plate portion 6a and a pair of cut and bent pieces 6d are formed in both side edges of the window aperture 6c. The cut and bent pieces 6d are bent to the receptacle portion 1b side of the frame 1 to press the IC card 7 received in the receptacle portion 1b and thereby prevent the card from jumping out due to vibrations or the like. The side plate portions 6b are each formed with earth terminals 6e, which are connected to earth patterns of a circuit board in an electronic device (not shown) for example to shield the IC card and the card connector device. The cover member 6 is fitted on the frame 1 so as to cover the receptacle portion 1b of the frame 1 and the contact plate 4.

The contact plate 4 is disposed in opposition to an inner surface of one side plate portion 6b. As the IC card is inserted into the card connector device, the contact plate 4 is pivotally moved and the contact portion 4c comes into abutment against the inner surface of the side plate portion 6b, whereby a switch portion is rendered conductive through the contact plate 4 and the cover member 6, so that a signal is outputted, for example, to an external control circuit via the terminal portion 4a of the contact plate 4 and the earth terminal 6e of the side plate portion 6b.

In this case, since the switch portion is constituted by utilizing the side plate portion 6b of the cover member 6, it is not necessary to dispose two contact plates and lead terminals opposedly in the switch portion, thus permitting the reduction in thickness and size of the entire card connector device.

Besides, since the whole of the contact plate 4 is covered with the cover member 6, it is possible to prevent damage of the switch portion against an external shock and the dust-proofing effect is improved.

Moreover, since the contact portion 4c of the contact plate 4 is provided at the tip on the free end side of the contact portion 4c, a long contact distance is ensured and it is possible to increase the contact pressure, whereby the contact reliability can be improved.

Further, if the projecting portion 4b which comes into abutment against the lug 7d as an IC card identifying portion is formed in a dome-like expanded shape, the operation of the sliding portion becomes stable, thus leading to a further improvement of reliability.

The IC card 7 is in wide use as a storage medium, with an integrated circuit (IC) incorporated therein. On a bottom side of the IC card 7 and on one end side thereof are formed a plurality of contacts 7a. The contacts 7a come into contact with the plural contacts 2a accommodated in the receptacle portion 1b of the frame 1 and positioned in the header 3, whereby various information processings between the card connector device and the external electronic device connected thereto are carried out.

On the side where the contacts 7a are formed, of the IC card 7, one corner is cut out in the shape of slant surface to form a cutout portion 7b. The slide member 8 which will be described later is brought into engagement with the cutout portion 7b, whereby the slide member can be moved in the card inserting direction as the IC card 7 is inserted into the card connector device.

In one side face of the IC card 7 is formed a recess 7c as a write inhibit identifier of the IC card, and the lug 7d, which is slidable, is positioned within the recess 7c. The position of the recess 7c can be changed by sliding the lug 7d and whether write is possible or impossible for the IC card can be changed in accordance with the position of the recess 7c which is thus changed.

To inhibit write for the IC card 7, as shown in FIGS. 9 to 11, the lug 7d is moved beforehand in the inserting direction of the IC card, whereby when the IC card is inserted up to the card receiving position, the lug 7d is abutted against the projecting portion 4b of the contact plate 4 attached to the frame 4. Consequently, the contact portion 4c of the contact plate 4 comes into contact with the inner surface of the side plate portion 6b of the cover member 6 opposed to the contact plate 4 to turn ON the switch portion, so that a signal is transmitted to a control circuit of an external electronic device connected to the card connector device, whereby it is possible to inhibit write for the IC card.

The slide member 8 is formed using an insulating material such as a synthetic resin and is disposed slidably on the right-hand side of the receptacle portion 1b of the frame 1. A spring accommodating recess 8a is formed at a center of the slide member 8 and the coiled spring 5 for return is installed within the recess 8a. One end side of the coiled spring 5 projected from one end side of the spring accommodating recess 8a is retained by the spring retaining portion 1g of the frame 1 and the slide member 8 is urged in the IC card ejecting direction by the coiled spring 5.

On the opposite side of the spring accommodating recess 8a is provided a spring holding portion 8b for holding the opposite end side of the coiled spring 5, and an axial bore 8c which supports one end side of a locking pin 9 pivotably is formed in the holding portion 8b. The opposite end side of the locking pin 9 is slidably engaged with the locking cam 1f provided on the frame 1 side, while one end side of the locking pin 9 is pushed against an inner wall surface of the axial bore 8c by means of the coiled spring 5.

Thus, the locking pin 9 is pushed against the inner wall surface of the axial bore 8c constantly with the biasing force of the coiled spring 5, so even when the IC card connector is used in a portable electronic device, it is possible to prevent the locking pin 9 from turning accidentally and becoming disengaged from the locking portion 1e of the locking cam if due to external vibrations or the like or from sliding reverse within the locking cam 1f.

On one end side of the slide member 8 is formed an engaging projection 8d for engagement with the cutout portion 7b of the IC card 7, and by engagement of the engaging projection 8d with the IC card 7 the slide member 8 can slide in both card inserting and ejecting directions together with the IC card. An end face of the engaging projection 8d, which is contiguous to an open end side of the spring accommodating recess 8a, comes into abutment against the wall-like delimiting portion 1h formed on one end side of the opening 1d of the frame 1 to stop a further movement than the overstroke of the slide member 8 when unlocked. Thus, the end face of the engaging projection 8d serves as a stopper portion 8e.

For allowing the IC card 7 to be received in the receptacle portion 1b, first from the state shown in FIGS. 15A and 15B, the IC card is inserted through the inlet port 1c of the frame 1. At this time, the cutout portion 7b of the IC card 7 and the engaging projection 8d of the slide member 8 are engaged with each other, so that the slide member 8 is moved in the card inserting direction together with the IC card 7 and the locking pin 9 slides within the locking cam 1f and is locked to the locking portion 1e (FIGS. 16A and 16B). In this state the IC card 7 is accommodated in the card receiving position.

Next, for ejecting the IC card 7 from the card receiving position in the receptacle portion 1b, the IC card 7 is once pushed in its inserting direction to disengage the slide member 8 from the locking cam 1f and the locking pin 9. As the IC card 7 moves while being pushed in its inserting direction, the slide member 8 is also moved in the card inserting direction. At this time, the slide member 8 does not protrude from the opening 1d of the frame 1 because the stopper portion 8e comes into abutment against the delimiting portion 1h formed on one end side of the opening 1d, but a front end portion 7e in the inserting direction of the IC card 7 protrudes from the opening 1d by an amount corresponding to the overstroke of the slide member 8 (FIGS. 17A, 17B and FIGS. 11, 14).

Thus, it is not necessary that a space corresponding to the overstroke of the IC card 7 be formed between the front end portion 7e of the IC card lying in the card receiving position and the rear end side of the card receptacle portion 1b of the frame 1. Therefore, it is not necessary to set large the depth of the card connector device, that is, it is possible to attain the reduction of size.

Although in the above embodiment the header 3 and the lock mechanism are formed integrally with the frame 1, they may be formed separately from the frame. It goes without saying that also in this case there are obtained the same effects as in the above embodiment.

As set forth above, in the card connector device according to the present invention, a switch portion, which is operated in accordance with insertion or ejection of the IC card, is constituted by a contact plate adapted to be pushed outward with insertion of the card and a part of a cover member adapted to be abutted against the contact plate, and the contact plate is brought into and out of contact with the cover member with insertion and ejection of the card. Since the switch portion is constructed by utilizing a side plate portion of the cover member, it is not necessary to dispose two contact plates or lead terminals opposedly in the switch portion, thus making it possible to attain the reduction in thickness and size of the whole of the card connector device.

Besides, the card is provided with a write inhibit identifier and the contact plate is brought into and out of contact with the cover member correspondingly to the identifier to detect whether write into the card is possible or not, and thus the detector switch portion can be formed with a simple configuration, so that it is possible to provide the card connector device less expensively.

Moreover, the contact plate is disposed at an outer side position of the frame and has a projecting portion projecting to the card receptacle portion side and also has a contact portion for abutment against the cover member on the side opposite to the projecting portion, the cover member being disposed so as to cover the contact plate together with the receptacle portion. Thus, since the whole of the contact plate is covered with the cover member, it is possible to prevent the switch portion from being damaged by an external shock and the dustproof effect is improved.

Further, since the contact portion of the contact plate is formed on a free end side with respect to the position where the projecting portion is formed, the contact distance can be taken large and the contact pressure can be set high, thus making it possible to improve the reliability of the contact.

Further, since the projecting portion of the contact plate is formed in an expanded shape like dome, the operation of the sliding portion becomes stable, thus leading to a further improvement of reliability.

Further, in the card connector device according to the present invention, connector terminals having plural contact pieces arranged correspondingly to arranged positions of contacts on the card side and also having plural connecting pieces drawn out from the contact pieces and soldered to a circuit board are disposed in a header, some of the plural contact pieces are spaced narrower than the other contact pieces, and the plural contact pieces are spaced at equal intervals in their juxtaposed direction so as to be wide for the narrow spacing of the some of the contact pieces and narrow for the spacing of the other contact pieces. Thus, even where some of the contact pieces are spaced narrow, there is no correspondingly narrow spacing among the plural connecting pieces, whereby the soldering work efficiency is improved.

Further, the connector terminals have base portions which support the contact pieces in a cantilevered state, the connecting pieces are formed projectingly on one end sides of the base portions, and the plural connecting pieces are arranged while being shifted little by little in the juxtaposed direction of the connector terminals with respect to the arranged positions of the plural contact pieces. Thus, with a simple configuration, the connecting pieces can be arranged at equal intervals in their juxtaposed direction.

The connecting pieces are contiguous to one end sides of the base portions positioned on the central side of the frame and are deviated toward the center of the frame with respect to the centers of the base portions, and free end portions of the connecting pieces are soldered to the circuit board through a through aperture formed in the frame. Since the connecting pieces as a whole are thus shifted to the center of the frame, it is possible to reduce the size of the through aperture through which the connecting pieces are passed for soldering and hence it is possible to increase the size of side edge portions of the frame, whereby the strength of the frame can be enhanced.

Further, since the connector terminals are integral with the header by molding in a projected state of the contact pieces and the connecting pieces from the header, it is possible to attain a simple configuration and a low cost.

Further, as to contact pieces spaced narrow out of the contact pieces of the connector terminals, coupler portions are formed at their base portions and are cut off after integral molding of the connector terminals to the header to separate the contact pieces from each other. Therefore, even as to such contact pieces spaced narrow from each other, sealed separation from mold cavities can be done if the coupler portions are held grippingly and simultaneously by the mold.

In the card connector device according to the present invention, a frame is provided with a card receptacle portion and a heart-shaped locking cam for locking a slide member to a card receiving position, the sliding member having a locking pin, an opening is formed in the frame on a rear end side of the card receptacle portion, and when the card is to be ejected, the card lying in the card receiving position is pushed in its inserting direction, causing a front end portion thereof to be protruded from the opening, with the result that the locking pin becomes disengaged from the locking cam and the card is ejected in its ejecting direction by the slide member. Thus, it is not necessary that a space corresponding to an overstroke of the card be formed between the front end portion of the card lying in the card receiving position and the rear end side of the card receptacle portion of the frame. Therefore, it is not required to increase the depth of the card connector device and it is possible to reduce the size of the connector device.

Further, the frame is formed with a delimiting portion for delimiting the movement of the slide member in a card pushing direction when the card lying in the card receiving position is pushed in the card inserting direction and after unlocking of the slide member. Since a stopper portion of the slide member comes into abutment against the delimiting portion, it is possible to prevent an excessive force from being exerted on the locking pin and the locking cam.

Further, since a slant surface-like cutout portion is formed at a front end position of the card and the slide member is brought into engagement with the cutout portion and is allowed to slide, a simple configuration permits the slide member to slide in both card inserting and ejecting directions together with the card.

One end side of the locking pin is secured pivotably to the slide member and is pushed against an inner wall surface of an axial bore by means of a biasing member, while the opposite end side thereof is engaged with the locking cam slidably. Since the locking pin is constantly pushed against the inner wall surface of the axial bore under the biasing force of the biasing member, even where the card connector device is used in a portable electronic device, it is possible to prevent the locking pin from turning accidentally and becoming disengaged from the lock portion of the locking cam due to external vibrations or the like or prevent it from sliding reverse within the locking cam.

Further, the biasing member is constituted by a coiled spring, the slide member is formed with a spring accommodating recess for receiving the coiled spring therein, and the axial bore is formed on one end side within the spring accommodating recess. Therefore, with the biasing force of the coiled spring, the locking pin can be constantly pushed against the inner wall surface of the axial bore.

What is claimed is:

1. A card connector device for receiving a card comprising:

a plurality of connector terminals arranged in a juxtaposed direction orthogonal to a card inserting direction;

a header having each of the plurality of connector terminals fixed thereto; and a frame contiguous to the header and having a card receptacle portion to hold the card, wherein each of the plurality of connector terminals includes
a contact piece which is projected into the receptacle portion and contacts a contact point of the card, and
a connecting piece which is projected from the header and electrically coupled to a circuit pattern of a circuit board;

at least two of spacings between adjacent ones of the contact pieces are unequal; and spacings between adjacent ones of the connecting pieces are equal.

2. A card connector device according to claim 1, wherein each of the plurality of connector terminals has a base portion which supports the contact piece in a cantilevered state, the connecting piece is formed to be projected on one end side of the base portion, and at least one of the contact pieces is shifted with respect to a corresponding one of the connecting pieces along a direction orthogonal to the card inserting direction.

3. A card connector device according to claim 2, wherein the connecting pieces are contiguous to one end sides of the base portions which are positioned on a central side of the frame,, at least one of the connecting pieces is shifted closer to a center of the frame along a direction orthogonal to the card inserting direction, and free ends of the connecting pieces are soldered to the circuit board through a through aperture formed in the frame.

4. A card connector device according to claim 2, wherein, each of the connecting pieces is projected and formed at one end and the other end of the base portion along the card inserting direction at the connector terminal.

5. A card connector device for receiving a card as recited in claim 6 further comprising:

an electrically conductive cover member attached to the frame so as to cover the card receptacle portion, wherein the frame is formed with a switch portion which is operated with insertion and ejection of the card, the switch portion comprising a contact plate which is pushed outward with insertion of the card and a part of the cover member which is brought into abutment against the contact plate, the contact plate being brought into and out of contact with the cover member with insertion and ejection of the card.

6. A card connector device according to claim 1, wherein the contact plate is disposed at an outer side portion of the frame and has a projecting portion projecting to a receptacle portion side and also has a contact portion, the contact portion being formed on the side opposite to the projecting portion and adapted to come into abutment against the cover member, and the cover member is disposed so as to cover the contact plate together with the receptacle portion.

7. A card connector device according to claim 6, wherein the contact portion is formed on a free end side with respect to a position where the projecting portion is formed.

8. A card connector device according to claim 6, wherein the projecting portion is formed in a dome-like expanded shape.

9. A card connector device for receiving a card as recited in claim 6 further comprising:

a slide member adapted to be engaged with the card and slidable in card inserting/ejecting directions;

a biasing member for urging the slide member in the card ejecting direction;

a heart-shaped locking cam; and a locking pin adapted to engage the locking cam to lock the slide member to a card receiving position, wherein an opening is formed on a rear end side of the card receptacle portion of the frame, and when the card is to be ejected, the card received in the card receiving position is pushed in the card inserting direction, allowing a front end of the card to be projected from the opening, whereby the locking pin is disengaged from the locking cam and the card is ejected in the card ejecting direction by the slide member.

10. A card connector device according to claim 9, wherein the frame is formed with a delimiting portion for delimiting the movement of the slide member in a direction in which the slide member is pushed after unlocked when the card lying in the card receiving position is pushed in the card inserting direction.

11. A card connector device according to claim 9, wherein one end side of the locking pin is pivotably secured to the slide member and is pushed by the biasing member to an inner wall surface of an axial bore into which one end side of the locking pin is inserted, while an opposite end side of the locking pin is engaged with the locking cam slidably.

12. A card connector device according to claim 11, wherein the biasing member is a coiled spring, the slide member is formed with a spring accommodating recess for receiving the coiled spring therein, and the axial bore is formed on one end side of the spring accommodating recess.

* * * * *